Oct. 5, 1965 KIYOSHI YAMAKAWA ETAL 3,210,446
METHOD OF MOLDING A THERMOPLASTIC FOAMED ARTICLE HAVING
A CORE OF THERMOPLASTIC COATED YARNS
Filed April 11, 1962 2 Sheets-Sheet 1

INVENTORS
KIYOSHI YAMAKAWA
SHIRO WADA
BY
ATTORNEY

United States Patent Office 3,210,446
Patented Oct. 5, 1965

3,210,446
METHOD OF MOLDING A THERMOPLASTIC FOAMED ARTICLE HAVING A CORE OF THERMOPLASTIC COATED YARNS
Kiyoshi Yamakawa, Ikeda-shi, Osaka, and Shiro Wada, Nishinomiya-shi, Hyogo-ken, Japan, assignors to Sekisui Adoheya Kogyo Kabushiki Kaisha, a corporation of Japan
Filed Apr. 11, 1962, Ser. No. 186,729
Claims priority, application Japan, Dec. 29, 1961, 36/48,300
7 Claims. (Cl. 264—47)

This invention relates to a method of preparing a thermoplastic resin sponge body containing yarns therein.

The object of this invention is to provide a soft thermoplastic resin sponge body of high tensile strength by firmly bonding a thermoplastic resin sponge layer to yarn.

Another object of this invention is to provide leather-like cords which are soft but have extremely great tensile strength.

Heretofore the technique of bonding cloth pieces with thermoplastic synthetic resins comprised knitting yarns into cloth pieces, and applying thereon, by means of calendering rolls, thermoplastic synthetic resin, for instance, vinyl chloride resin blended with a plasticizer. The products thereof having been commercialized as artificial or synthetic leather.

Further, similar products wherein said thermoplastic synthetic resin layer is foamed also have been sold.

However, those produced by the known method have a common deficiency in that the bond of the cloth piece to the thermoplastic synthetic resin layer or the spongy synthetic resin layer is not firm. Consequently the resin layer tends to peel off from the cloth piece when such synthetic leather is rubbed or scratched.

We presume that the above easy peeling off of said thermoplastic synthetic resin layer or sponge layer from the cloth piece is caused by insufficient penetration of the resin layer or the sponge layer into the narrow spaces, projections and depressions present on the knitted surfaces of the cloth. Therefore experiments were conducted with a direct application of a sponge layer to the yarns before they were knitted, that is, while they were still in the state of individual yarns. A sponge layer was adhered directly to fibers which were in the form of yarn. The resulting sponge adhered yarns were arranged or knitted together and a further sponge layer was formed thereon. However, by such a process the bonding of the sponge layer with the fibers was still insufficient.

In another experiment heated and softened thermoplastic resin was directly applied to a cloth piece. A sponge layer consisting of the same type of thermoplastic resin was formed on said cloth piece. The bonding of the sponge layer to the cloth was still unsatisfactory.

After further studying the problem from various angles, it was discovered that the bonding of yarns with a sponge layer can be made very firm by the following steps: coating each yarn with a thin layer of thermoplastic resin preferably void of air bubbles, forming a collective body of thus thinly coated yarns by aligning a great number thereof or by knitting, and on said collective body of the yarns further forming a sponge layer of the thermoplastic resin. This invention was completed based on said discovery.

Thus this invention relates to a method for production of a long, thermoplastic resin sponge body containing yarns as its core, which comprises: immersing individual yarns in a viscous liquid containing thermoplastic resin to cause the penetration of said thermoplastic resin throughout the interstices of the monofibers composing the yarns and to form a thin layer of the thermoplastic resin surrounding the yarn; collecting and aligning a plural number of thus resin-coated yarns in the direction of their longitudinal axes, thereby forming a long, collective body of yarns; and thereafter forming on the whole surfaces of said yarn group a thick layer of a foamable, thermoplastic resin adherable with the aforesaid thermoplastic resin, while in a plasticized state by heat, thereby to bond the yarns into one cohesive body.

The yarns to be used in this invention may be yarns of natural fibers such as cotton and linen, or they may be yarns of synthetic fibers as of polyamide resin, polyester resin, polyvinyl formal resin, polyacrylonitrile resin, polyvinyl chloride resin, etc. Glass fibers are also usable. Mixed spun yarns of these fibers can also be used. Among these, glass fibers are particularly suitable for reinforcing purposes since the same have a high tensile strength, age resistance, and chemical resistance, and moreover change little due to temperature and humidity variation.

The aforesaid yarns can be of monofibers or a plurality of fibers twisted together. However a particularly conspicuous effect was manifested with yarns of many monofibers twisted together.

Any thermoplastic resin capable of forming a sponge body is useful for this invention. Among them polyvinyl chloride, polyethylene, polystyrene, polypropylene or their copolymers, natural and synthetic rubber may be named. Vinyl chloride resin is particularly suitable because of its low cost, and because its softness can be easily adjusted by controlling the amount of the plasticizer.

In this invention it is first necessary to coat the aforesaid yarns each with aforesaid thermoplastic resin.

Where the yarn is that formed by twisting together monofibers, the above operation must be carried out in such a manner that the coating resin should sufficiently penetrate into the interstices of the monofibers. For this purpose it is necessary to immerse the long yarn strands in a viscous liquid containing the thermoplastic resin.

"A viscous liquid containing the thermoplastic resin" referred to in the above includes resin-emulsion solutions wherein fine particles of the thermoplastic resin are suspended in an aqueous resin solution formed by dissolving the thermoplastic resin in a solvent, or a solution formed by suspending the thermoplastic resin in its swelling agent or a plasticizer.

In case a vinyl chloride resin with a plasticizer is used as the thermoplastic resin, so-called vinyl chloride resin plastisol, prepared by suspending vinyl chloride resin powder in a plasticizer, can be most conveniently and effectively used. Because if a yarn is immersed in vinyl chloride resin emulsion, it will pick up with the resin a large amount of water, consequently making it necessary to remove the picked-up water by the additional step of allowing the yarn to stand or heating the same for a long period.

Similarly if the yarn is immersed in a vinyl chloride resin solution, the same will also pick up a large amount of the solvent used, and a complicated operation to remove the solvent therefrom will be again necessitated.

On the contrary if vinyl chloride resin plastisol is used, which gells by a short period of heating, it is possible to coat the yarn readily with vinyl chloride resin.

In coating the yarn with a thermoplastic resin according to this invention, it is necessary that the thermoplastic resin should fully penetrate into the interstices between each of the monofibers composing the yarn. The resin coating should cover all the surfaces of the yarn to the maximum possible extent. Furthermore the resin coating layer should be as thin as possible. This is particularly true when the yarn consists of a plurality of monofibers twisted together.

In order to achieve a better penetration of resin into the interstices among the monofibers of the yarn, it is desirable that the viscosity of the viscous liquid containing a thermoplastic resin be as low as possible. Generally, the viscosity level of thermoplastic resins used in conventional extrusion and calendering processing is too high for purposes of this invention. It is therefore necessary to use a thermoplastic liquid having lower viscosity than that used in extrusion and calendering processes. If the thermoplastic resin adheres on the surface of the yarn with too great a thickness, such will be deleterious to the later operation of adhering thereon a sponge layer of a thermoplastic resin. Thus it is necessary to make the coating formed by the viscous liquid of the thermoplastic resin as thin as possible. Further, the fact that this layer directly coating the yarn must necessarily cover all the surfaces of the yarn with a minimum thickness requires the substantial absence of bubbles in the layer. In order to achieve further penetration of the resin into the interstices among the monofibers composing the yarn, it is desirable to add a mechanical power to the yarn in the viscous liquid containing the thermoplastic resin or before or after the immersion, by rubbing or squeezing the yarn. To accomplish this purpose, the material to be treated must not be in the form of knitted fabric, but in the form of individual yarns. If yarns consisting of glass fibers twisted together are used, a pre-treatment of the material glass fibers with vinyl chlorosilane will give a better result, with the improved adherence between the yarn of such glass fibers and the thermoplastic resin.

FIG. 1 of the attached drawings shows a strand of the yarn thus coated with a resin layer substantially void of bubbles.

Hereinafter the above-described thin resin coating layer may be referred to as the first layer.

According to this invention, a number of the yarns thus coated by the first layer are collected and aligned in the direction of their longitudinal axes, forming a yarn group of great length. There are two ways of forming this yarn group: one is to align numbers of yarns in the direction of their longitudinal axes only, without using woofs; and the other is to form fabric by weaving a number of yarns in two directions perpendicular to each other, as warps and woofs.

In this invention, the whole surfaces of the yarn group made as in the above are coated with a thick sponge layer of the thermoplastic resin, so that the yarns are buried in said sponge layer forming one, cohesive body. For this purpose, it is necessary either to apply a heated and softened thermoplastic resin containing a foaming agent on said yarn group, or to let said yarn group pass through a crosshead die connected with an extruder to effect extrusion coating thereof.

In either case, the coating is effected with the thermoplastic resin particularly in the heated and softened state, and without specific care the sponge layer for coating at this stage naturally becomes much thicker than the first layer which is coating the individual yarns.

However, in this invention it is necessary that the thickness of the second layer be made greater than that of the first. Known means to thicken the sponge layer within the necessary limit (for instance, to widen the passage of the resin in the cross head dies) may be employed.

Further, in order to avoid the formation of small pores opening to the surfaces of the finished product, it is necessary to compress the same between such means as a pair of opposed rolls, etc., and while its surfaces are still soft, to crush the pores on the surfaces. At that time if desired, patterns may be given to the surfaces.

To make the thermoplastic resin coating layer sponge-like, a compound which decomposes upon heating with generation of a great amount of gas such as azobisisobutyldinitrile, azodicarbonamide, dinitrosopentamethylenediame is mixed into the thermoplastic resin, and coating therewith is effected under heating. It is also possible to adopt such a method as first mixing with the thermoplastic resin a water-soluble inorganic salt such as anhydrous Glauber's salt powder, or organic starch powder, then coating the yarn group with the mixed thermoplastic resin with heating, and thereafter dissolving away the water-soluble substance in water to leave behind empty holes in the thermoplastic resin.

Figure 1:
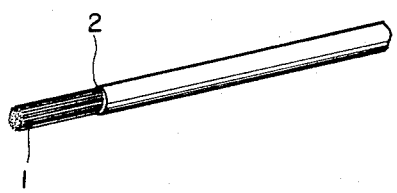
Figure 2:
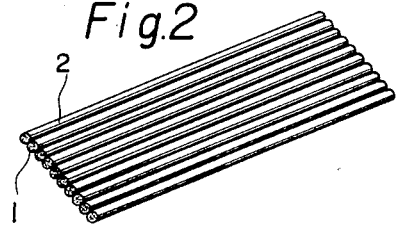
FIG. 2 is a perspective view of the yarn group prepared by disposing numbers of the coated yarns in the longitudinal direction without using woofs.
Figure 4:
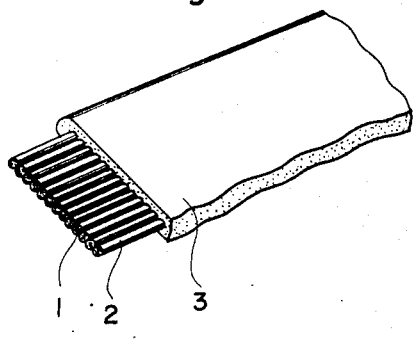

FIG. 4 is a perspective view of the product obtained upon coating the group of plurality of yarns composed as shown in FIG. 2 with a sponge-layer of the thermoplastic resin.

Figure 3:
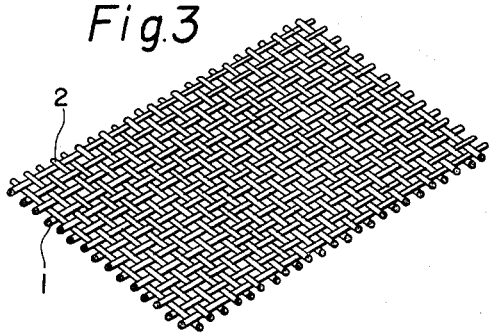
FIG. 3 is a perspective view of the yarn group made weaving the warps and woofs of the plurality of yarns coated as in the above.
Figure 5:
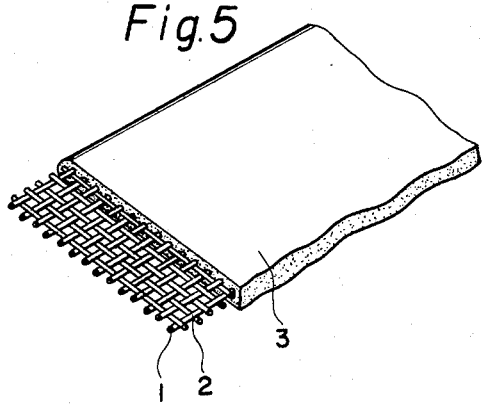

FIG. 5 is a perspective view of the product obtained upon coating the groups of plurality of yarns composed as shown in FIG. 3 with a sponge-layer of the thermoplastic resin.

The product thus obtained is cut in the longitudinal direction. In the section thereof, the outermost sponge layer is much thicker than the first layer coating the individual yarns. Therefore, the sponge layer is the most conspicuous and the first layer is hardly visible.

The product thus prepared is coated on its outermost part with a thick sponge layer which strongly bonds with the yarn group.

Thus a product is obtained which, although it is a soft, sponge-like material composed of thermoplastic resin, characteristically has an extremely great tensile strength against the tension given in the direction along the longitudinal axes of the yarns because of the orderly aligned yarns contained inside of the product.

In these products the first layer 2 intervening the yarns 1 and sponge layer 3, the bonding between the yarns 1 and the sponge layer 3 is very firm. The first layer 2 is well adhered to the yarn 1 because the first layer is formed prior to the collection or alignment of the yarns into groups and therefore the viscous resin liquid thoroughly penetrates the interstices of each monofiber composing each yarn. Further, the first layer 2 and the sponge layer 3 are composed of mutually adherable thermoplastic resin mutually adherable, the bonding therebetween is thus made sufficiently strong. Separation of the sponge layer from the yarns is hardly observable even when this product is rubbed or scratched.

The products of this invention have a uniquely high elasticity and softness in their sponge layer, particularly those in which a soft, flexible resin is used as the thermoplastic resin, such as the product employing a vinyl chloride resin blended with a plasticizer. Moreover, such gives a warm feeling as well as an elasticity pleasant to the finger when pushed in and has a high tensile strength in the direction of alignment of the yarns. Inter alia, the stringy product wherein the yarns are aligned as shown in FIG. 4 is particularly suitable for a use as leather cord and sash-cord and commercially of high value. When said products are used as strings and tied together, the knot formed is virtually untieable even under some additional tension and pressure due to the sponge layer. Furthermore, they are soft and pleasant to the touch.

The details of this invention shall be further described with examples, it being understood that these examples are given only by way of illustration and the scope of this invention is in no sense limited thereby.

EXAMPLE 1

Long glass fibers composed of 1000 bolane-treated glass monofibers of diameter of 7 microns were twisted together and immersed in a plastisol of vinyl chloride resin of the following composition, under a slight tension. During the passage of the same yarn through the bath, the long yarn was pressed against the surface of the guide roll thereby to bring about sufficient penetration of the plastisol into the interstices of the monofibers.

Composition of the plastisol

| | Parts |
|---|---|
| Vinyl chloride resin (paste resin) | 60 |
| Plasticizer (dioctylphthalate) | 58 |
| Stabilizer (dibasic lead stearate) | 3 |
| Stabilizer (dibasic lead phosphite) | 1.2 |

Then the yarn was taken out of the bath and led through a narrow space to remove excess plastisol picked up. Thereafter, it was passed instantaneously through an electric oven at 360° C. upon which the picked-up plastisol was gelled and dried. Twenty-seven of the thus obtained yarns were aligned parallel to one another, and each one adjacent to the next, so that a yarn group in single layer was obtained.

Subsequently a vinyl chloride resin of the composition shown below was fed to an extruder, the fore-edge thereof being provided with a crosshead die with a narrow opening of 2 mm. x 12 mm. in size. Then by passing said yarn group through the crosshead die, a spongy vinyl chloride resin was extrusion-coated on the yarn group by the conventional extrusion method. Immediately after the coated yarn group leaves the crosshead die, the surfaces thereof were compressed with a pair of opposed rollers so that the surface pores could be crushed and smooth surfaces obtained.

Composition of spongy vinyl chloride resin layer

| | Parts |
|---|---|
| Vinyl chloride resin | 100 |
| Plasticizer: | |
|     (DOP) dioctylphthalate | 27 |
|     (DOA) dioctyladipate | 5 |
|     (BBP) butylbenzyl phthalate | 13 |
|     Adekacizer O-120—product of Asahi Denka, Kabushiki Kaisha, Japan, epoxy soy bean oil | 10 |
| Stabilizer: | |
|     Tribasic lead sulphate | 2 |
|     Dibasic lead stearate | 0.2 |
|     Calcium stearate | 0.05 |
| Foaming agent: Azodicarbonamide Tradename—Cellogen AZ. | 0.4 |

By the above operation, immediately after the extrusion coating the vinyl chloride resin layer become spongy, and a long, flat string-like product having a thickness of about 3 mm. and a width of 13 mm. was obtained.

This long string-like product showed a certain degree of tensile strength against horizontal tension in spite of the fact that it had no woof in the direction perpendicular to its longitudinal axis, and showed a very great tensile strength against the tension in the longitudinal direction because of the yarns contained therein. This product as a whole was soft, and had an elasticity and warm touch characteristic of a spongy product. Particularly, even if the same were bent repeatedly, it was still a single cohesive body without any sign of separation of the yarns from vinyl chloride resin.

Accordingly it was a commercial product particularly suitable for sash-cord, bracelet, necklace, belt, etc.

EXAMPLE 2

Tough staple fiber of 16 count was immersed in a polystyrol emulsion of the following composition under a slight tension, and treated similarly as in Example 1.

Composition of polystyrol emulsion

| | Parts |
|---|---|
| Polystyrol resin | 100 |
| Benzole | 100 |
| Di-butyl-phthalate | 10 |
| Toluene | 210 |
| Emulsifier (Aktenole G-120—product of Matsumoto Yushi Seiyaku Kaisha, Japan), composed mainly of polyethylene glycol lauryl ether | 4 |
| Water | 206 |

After thoroughly removing the water picked up by the yarn and drying the same, 30 of such yarns were aligned parallel to one another, and each one adjacent to the next to form a yarn group of a single layer. On said yarn group a foamable polystyrol of the following composition was extruded to coat the former. Immediately after the polystyrol was extruded from the extruder, the surfaces thereof were made smooth by compression with a pair of rolls, to provide a flat, string-like long product having a thickness of 1.5 mm. and a width of 14 mm.

Composition of foamable polystyrol

| | Parts |
|---|---|
| Polystyrol resin | 100 |
| Pentane | 3 |
| Water | 1.5 |

The thus obtained flat, string like long product had similar characteristics to the product obtained in Example 1. This product is particularly suitable for winding and coating various materials for the purpose of insulation.

What we claim is:

1. A method for preparing a long, soft vinyl chloride resin sponge body containing yarns as its core, which comprises immersing a yarn composed of monofibers having interstices therebetween, in a plastisol of vinyl chloride resin until said plastisol fully penetrates into the interstices between the monofibers of the yarn, gelling the plastisol to form around said yarn a thin layer of vinyl chloride resin containing a plasticizer which is substantially free of air bubbles, forming a long yarn group by aligning a plurality of the yarns coated with the vinyl chloride resin in the direction of their longitudinal axes, thereafter extrusion-coating the entire surfaces of said yarn group with a layer of vinyl chloride resin containing a foaming agent which generates gas upon heating and a plasticizer while the resin is in a plasticized state by heat, thereby to firmly bond the yarns into one, cohesive body.

2. A method for preparing a thermoplastic resin sponge body having a core of thermoplastic resin coated yarns, composed of monofibers having interstices therebetween, which comprises (1) immersing individual yarns in a liquid containing a first thermoplastic resin to form a first thin layer around each of said yarns (2) forming a coated yarn group by aligning a number of said yarns in the direction of their longitudinal axes, (3) forming a second layer, of a foamable thermoplastic resin which is adherable to said first thermoplastic resin, over the surfaces of said coated yarn group, and (4) foaming said second layer, thereby firmly bonding the yarns into a single cohesive body.

3. The method of claim 2 wherein the yarns employed are glass yarns.

4. A method for preparing a thermoplastic resin sponge body having a core of thermoplastic resin coated yarns, composed of monofibers having interstices therebetween, which comprises (1) immersing individual yarns in a liquid containing a first thermoplastic resin to form a first thin layer around each of said yarns (2) forming a coated yarn group by aligning a number of said yarns in the direction of their longitudinal axes, (3) applying a second layer, of a heated and softened thermoplastic resin containing a foaming agent on said coated yarn group, which is adherable to said first thermoplastic resin, and (4) foaming said second layer, thereby firmly bonding the yarns into a single cohesive body.

5. A method for preparing a thermoplastic resin sponge body having a core of thermoplastic resin coated yarns, composed of monofibers having interstices therebetween, which comprises (1) immersing individual yarns in a liquid containing a first thermoplastic resin to form a first thin layer around each of said yarns (2) forming a coated yarn group by aligning a number of said yarns in the direction of their longitudinal axes, (3) extrusion-coating a second layer, of foamable thermoplastic resin, which is adherable to said first thermoplastic resin, on said yarn coated group, and (4) foaming said second layer thereby firmly bonding the yarns into a single cohesive body.

6. A method for preparing a thermoplastic resin sponge body having a core of thermoplastic resin coated yarns, composed of monofibers having interstices therebetween, which comprises (1) immersing individual yarns in a liquid containing a first thermoplastic resin to form a first thin layer around each of said yarns (2) forming a coated yarn group by aligning a number of said yarns in the direction of their longitudinal axes and further adding woofs and interweaving them, (3) forming a second layer, of a foamable thermoplastic resin which is adherable to said first thermoplastic resin, over the surfaces of said coated yarn group, and (4) foaming said second layer, thereby firmly bonding the yarns into a single cohesive body.

7. The method of claim 6 wherein the yarns employed are glass yarns.

References Cited by the Examiner
UNITED STATES PATENTS

| | | | |
|---|---|---|---|
| 2,518,454 | 8/50 | Elliott | 264—47 XR |
| 2,642,920 | 6/53 | Simon et al. | 264—45 XR |
| 2,903,779 | 9/59 | Owens | 28—80 |
| 2,939,200 | 6/60 | Ewing et al. | 161—192 |
| 3,088,188 | 5/63 | Knudsen | 264—167 XR |
| 3,091,019 | 5/63 | Wetteran | 264—47 XR |
| 3,100,926 | 8/63 | Richmond | 264—45 XR |

FOREIGN PATENTS 840,398   12/56   Great Britain.

OTHER REFERENCES

Journal of Polymer Science, "Microvoids in Fibers as Studied by Small—Angle Scattering of X-rays," by Stratton, W. O., vol. 58, April 1962, pp. 205–220.

ALEXANDER H. BRODMERKEL, *Primary Examiner.*

MORRIS LIEBMAN, *Examiner.*